UNITED STATES PATENT OFFICE 2,521,720

ANTIFOULING PAINTS AND COMPOSITIONS OF MATTER

William H. Hill, Mount Lebanon, Pa., assignor to Koppers Company, Inc., Pittsburgh, Pa., a corporation of Delaware No Drawing. Application December 13, 1945, Serial No. 634,895

19 Claims. (Cl. 106—15)

This invention relates to compositions of matter and to compositions and methods for protecting material from attack by pestiferous microorganisms.

An object of the invention is to provide compositions of matter. Another object of the invention is the combatting of pestiferous organisms. Still another object of the invention is improved coating compositions, more particularly of the antifouling paint type. Other objects will appear as the description proceeds.

These objects are accomplished in the present invention by means of new compositions of matter and methods for the control of a wide variety of pestiferous organisms, particularly bacteria, fungi and marine organisms. These novel toxicants consist in the organo-metal salts of perthiocyanic acid.

The novel composition of matter of the invention may be represented by the formula $R_mMX_n$ in which $R_m$ represents at least one organic radical linked to M through carbon; M may be any polyvalent metal (including metalloids) capable of forming stable organo-metal compounds; $X_n$ represents at least one anion at least one of which is the anion of perthiocyanic acid and in which the sum of $m$ and $n$ is equal to the valence of M. $R_mM$ represents the organo-metal radical which, by definition therefor, is a polyvalent metal having at least one free valence and at least one organic radical linked to the metal through carbon.

The polyvalent metals which most suitably form stable organo-metal compounds according to the invention are the odd series heavy metals from tin up. Platinum and chromium, and the metalloids arsenic, selenium and tellurium also form sufficiently stable organo-metal compounds.

The odd series heavy metals above indium, viz., tin, antimony, gold, mercury, thallium, lead and bismuth, are commonly characterized not only by their sequential arrangement in the odd series of the periodic system, but also in their characteristic marked physiological activity, a property which imparts particular utility to the composition of matter of the present invention.

The term "metal" is used in a broad sense to include any element such as the metalloids which act as a metal in the organo-metal radical.

The organo-metal salts of perthiocyanic acid according to the invention are readily prepared by acting upon an organo-metal hydroxide or salt with perthiocyanic acid or salt according to the straight metathetical double decomposition represented by the following equation:

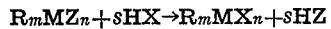

$$R_mMZ_n + sHX \rightarrow R_mMX_n + sHZ$$

in which R, M, X, $m$ and $n$ are as above described and Z is an indifferent anion. For example, R may be ethyl, propyl, isopropyl, phenyl, hydroxyphenyl, nitro and dinitrophenyl, alkyl phenyl, benzyl, phenethyl, cinnamyl, naphthyl, cyclohexyl, bornyl, and like aliphatic, hydroaromatic and aromatic radicals; M may be any of the odd series polyvalent elements above indium, preferably the heavy metals of this group, as well as chromium and platinum and like polyvalent metals capable of forming stable organo-metal compounds and Z may be chloride, acetate, nitrate, hydroxyl and like indifferent anions. $s$ may be one or more according to the number of Z anions to be replaced in the reaction. One or more of the Z anions may be replaced. For example, with organic lead compounds where the metal is tetravalent, the organo-metal compound may have as many as three indifferent anions. Any or all of them may be replaced by a thiocyanate group. Similarly, an organo-lead compound may have as many as three organic radicals. In case of the dibasic perthiocyanic acid, one or both of the hydrogens may be replaced by an organo-metal radical.

The reaction as described above is readily brought to completion by withdrawing one of the products of the reaction. When the acids and bases are available, which is not usually the case, the reaction is brought to completion by the formation of water in a simple neutralization reaction. Where salts of the organo-metal compounds or the perthiocyanic acid or both are used, the reaction is most easily brought to completion by carrying it out in a solvent in which the organo-metal salt of perthiocyanic acid is relatively insoluble as compared with the reagents. For example, a suitable organo-metal hydroxide or salt, for example, the chloride, acetate or nitrate, may be reacted with an ammonium perthiocyanic or other alkali-metal perthiocyanate in ethanol or other solvent such as methanol and acetone to give a precipitate of an organo-mercuri perthiocyanate. In this manner by suitable choice of R and M, there may be easily obtained a wide variety of organo-metal salts of perthiocyanic acid.

The following examples in which the parts are by weight and in the C. G. S. system unless otherwise specified illustrate the preparation of typical compounds according to the invention:

EXAMPLE 1

Phenyl-mercuri perthiocyanate

A. To a solution of 1680 parts of phenyl mercury acetate dissolved in 25,000 volume parts of ethyl alcohol was added a solution of sodium perthiocyanate prepared by adding 375 parts of perthiocyanic acid to 200 parts of sodium hydroxide in 5000 parts of water. A light yellow precipitate formed immediately. The mixture was refluxed for several hours in order to ensure complete reaction.

B. A solution of 1680 parts of phenyl mercury acetate dissolved in 35,000 volume parts of absolute ethyl alcohol was added to 500 parts by volume of alcoholic solution of ammonium perthiocyanate containing 170 parts by weight of ammonia and 375 parts of perthiocyanic acid. A yellow precipitate formed immediately and the mixture was allowed to digest at room temperature for several hours.

The solid precipitates after being filtered off and dried gave the following:

| Per cent | S | N | Hg |
|---|---|---|---|
| Found: | | | |
| A | 13.7 | 3.0 | 55.0 |
|   | 13.9 | 3.2 |    |
| B | 13.3 | 3.3 | 55.9 |
|   | 13.4 | 3.4 |    |
| Theory | 13.4 | 3.8 | 55.8 |

EXAMPLE 2 n-Propyl-mercuri perthiocyanate

To a solution of 16 parts of propyl mercury bromide in 100 volume parts of alcohol was added a solution of 3.8 parts of perthiocyanic acid in 125 volume parts of alcohol saturated with ammonia. A cream-colored precipitate formed immediately and was filtered off. After washing successively with alcohol and water and drying in the desiccator, there was obtained 12 parts of product or a yield of 75 per cent of theory.

EXAMPLE 3

Isopropyl-mercuri perthiocyanate

On substituting isopropyl mercury bromide for n-propyl mercury bromide in the preceding example, there was obtained 15 parts of product or a yield of 94 per cent of theory.

EXAMPLE 4 p-Hydroxy phenyl-mercuri perthiocyanate

To a warm solution of 16 parts of p-hydroxy phenyl mercury chloride in 2000 parts of alcohol containing 50 parts of acetone was added a solution of 4.6 parts of ammonium perthiocyanate in 125 volume parts of alcohol. After standing overnight the precipitate was filtered off, washed with alcohol and then ether and then dried under vacuum. 17 parts, a yield of 92 per cent, of fine yellow crystals was obtained.

By processes similar to those illustrated above, there may be obtained a wide variety of organometal thiocyanates by substituting other organometal salts of indifferent acids and by substituting suitable salts of isothiocyanic acid or dithiocyanic acids for the sodium and ammounium thiocyanates and perthiocyanates.

The new toxicants of the invention may be used generally for the control of micro-organisms such as fungi, but are particularly suitable for inclusion in film-forming compositions to inhibit development and propagation of undesirable organisms on films produced from such compositions. In the use and application, they are applied to the material or object to be protected in admixture with such carriers and adjuvants as are customary or suitable for the particular material or object involved and the particular pest which is to be controlled. Ordinarily, the material is so compounded with carriers and adjuvants or the material to be protected as to distribute the toxicant in or on the material or object to be protected thereby to provide a toxic barrier or coating between it and the pestiferous organism.

It is well recognized in the art that the appearance or utilities of films obtained from various types of paints, varnishes and like protective or decorative film-forming compositions, may be impaired by the growth on the film of undesirable organisms. Thus, ordinary oil paints, which contain very little zinc oxide or other toxic pigments, are likely to suffer deterioration by the attack of mold or bacteria and like fungi. Water-bound paints such as distemper paints, casein paints and oil-bound water paints, now all commonly in use, are subject to deterioration by fungal attack. New toxicants of the invention may be included in such paints to inhibit these attacks without objectionally affecting the desirable characteristics of the respective paints, such as coverage, hiding power, drying, etc.

There is also a well recognized need in the art for toxicants which may be included in ships' bottom paints to prevent the growth of marine organisms on the parts of ships, pontoons and like structures exposed to sea water. This problem is particularly a difficult one because these organisms, unlike those noted above, do not rely upon the paint film for nutriment but obtain their nourishment from the sea water. Toxicants which are effective in ordinary film-forming compositions may be entirely ineffective in ships' bottom paints, otherwise known as antifouling paints. Many of the toxicants of the invention, especially the hydrocarbon-metal perthiocyanates, are unusually effective, possessing the unusually high toxicity, permanence and stability necessary in antifouling paint toxicants.

Hydrocarbon-metal perthiocyanates thus useful according to the invention may be presented by the formula $(R_mM)_2X$ where R is a hydrocarbon radical, M is a polyvalent metal of the character fully noted above, X is a perthiocyanate radial and $m$ is one less than the valence of M. They may be prepared as above noted by acting upon hydrocarbon-metal hydroxide or salt with a perthiocyanate, according to the equation:

$$2/s(R_mM)_sZ + Na_2X \rightarrow (R_mM)_2 + 2/sNa_sZ$$

where R, M, X and $m$ are as above described, Z is an indifferent anion and $s$ equals the valence of Z. For example, R may be ethyl, propyl, isopropyl, phenyl, alkyl phenyl, benzyl, phenethyl, cinnamyl, cyclohexyl, bornyl, and like aliphatic, hydroaromatic and aromatic hydrocarbon radicals; M may be any of the metals of the group or classes noted above particularly the heavy metals of the odd series above indium; and Z may be chloride, acetate, nitrate, hydroxyl and like indifferent anions.

The hydrocarbon-metal perthiocyanates are particularly effective toxicants because of their persistency (resistance to leaching, evaporation, etc.) and general over-all effectiveness and because they do not adversely affect the coverage, hiding power, drying characteristics and like physical properties of the compositions. They may be incorporated not only in antifouling paints but also in other coating compositions which are subject to attack by bacteria and fungi. Being water-insoluble and oil-insoluble they may simply be dispersed in the film-forming vehicle of the coating composition in suitable concentration according to the particular purpose for which the coating composition is intended or according to the particular organisms involved.

The hydrocarbon-mercuri perthiocyanates, such as ethyl, propyl, isopropyl and phenyl-mercuri perthiocyanates, are particularly useful according to the invention. They are effective in very low concentration, for example, $\frac{1}{10}$ of 1 per cent to 1 per cent, in preventing the fungal attack upon the ingredients of the film-forming composition and in higher concentration, for example, 2.5 to 15 per cent, in antifouling paints to prevent growth of marine organisms. The effectiveness of the toxicants of the invention is of particular interest in view of the increased demand of highly efficient paints brought about by high speed water vehicles now in common use. With such vehicles as speed boats, and hydroplanes, very little fouling can be tolerated without marked reduction in the speed and efficiency of the vehicle.

Antifouling paints are basically composed of a film-forming agent and a volatile solvent or thinner, together with such other adjuvants as pigments, fillers, driers, etc., as may be required to impart optimum physical characteristics, such as color, coverage, hiding power and drying, brushing and spraying properties. The toxicant is dispersed in this vehicle in proportion effective to inhibit the growth of marine organisms on the dried film. Typical formulas are described in United States Patent No. 2,176,597 and United States Maritime Commission Specification No. M. C. 52-B-1, August 28, 1939. Other typical formulations, including the United States Navy Formula 15-RC, are described in United States Patent No. 2,287,218. According to the present invention the toxicants of these typical formulations or any other antifouling paint formulation may be replaced in whole or in part by hydrocarbon-mercuri perthiocyanates. For example, in Navy Formula 15-RC the mercuric oxide and the cuprous oxide and/or both may be replaced by phenyl-mercuri perthiocyanate or the ethyl, propyl and isopropyl analogues. Such compositions containing 10 per cent of hydrocarbon-mercuri perthiocyanate have proved effective in preventing substantially all growth of marine organisms. Lower concentrations, 3.6 per cent for example, while less effective, still show marked inhibitions of marine growth and only slight fouling. This low concentration in combination with cuprous oxide or copper bronze at 11.5 per cent is only slightly less effective than 10 per cent of the hydrocarbon-mercuri perthiocyanate alone. Thus, suitable concentrations, up to about 64 per cent of the hydrocarbon-mercuri perthiocyanate, may be replaced by insoluble coppers such as cuprous oxide and metallic copper.

I claim:

1. An organo-metal perthiocyanate having a carbon atom of an organic radical linked to the perthiocyanate group through a metal.

2. An organo-metal perthiocyanate having the formula $(R_mM)_2X$ in which R represents a hydrocarbon radical, X represents a perthiocyanate radical and $m$ is equal to the valence of M less one and in which M is a metal which forms organo-metal compounds.

3. An organo-mercuri perthiocyanate in which a carbon atom of an organic radical is linked to a perthiocyanate group through mercury in a typical organo-mercury linkage.

4. The composition of claim 1 in which the metal is tin.

5. The composition of claim 1 in which the metal is lead.

6. The composition of claim 2 in which the metal is tin.

7. The composition of claim 2 in which the metal is lead.

8. A composition of matter comprising a hydrocarbon-mercuri perthiocyanate.

9. Phenyl-mercuri perthiocyanate.

10. Ethyl-mercuri perthiocyanate.

11. A propyl-mercuri perthiocyanate.

12. Isopropyl-mercuri perthiocyanate.

13. An antifouling paint comprising an antifouling paint vehicle having dispersed therein a toxicant an essential active ingredient of which is phenyl-mercuri perthiocyanate.

14. The method which comprises effecting double decomposition between a perthiocyanate salt and an organo-metal compound of the type $R_mMZ_n$ where R is an organic radical linked to M through carbon, Z is an indifferent anion, and M is a polyvalent metal capable of forming stable organo-metal compounds and in which the sum of $m$ and $n$ is equal to the valence of M, withdrawing one of the products of the decomposition and recovering the organo-metal perthiocyanate thus formed.

15. An antifouling composition for protecting surfaces exposed to sea water from attachment and growth thereon of barnacles and like marine organisms which tend to foul such surfaces, said composition comprising a water-resisting coating vehicle and an antifouling agent incorporated therein in an amount sufficient for substantially preventing adhesion of barnacles and like marine organisms on said surfaces, an essential toxic ingredient of said antifouling agent being an hydrocarbon-metal perthiocyanate in which a hydrocarbon group is linked to the perthiocyanate group through a metal.

16. An antifouling composition for protecting surfaces exposed to sea water from attachment and growth thereon of barnacles and like marine organisms which tend to foul such surfaces, said composition comprising a water-resisting coating vehicle and an antifouling agent incorporated therein in an amount sufficient for substantially preventing adhesion of barnacles and like marine organisms on said surfaces, an essential toxic ingredient of said antifouling agent being phenyl-mercuri perthiocyanate.

17. An antifouling composition for protecting surfaces exposed to sea water from attachment and growth thereon of barnacles and like marine organisms which tend to foul such surfaces, said composition comprising a water-resisting coating vehicle and an antifouling agent incorporated therein in an amount sufficient for substantially preventing adhesion of barnacles and like marine organisms on said surfaces, an essential toxic ingredient of said antifouling agent being phenyl-mercuri perthiocyanate in an amount between about 2.5 and about 15% of the total composition.

18. An antifouling composition for protecting surfaces exposed to sea water from attachment and growth thereon of barnacles and like marine organisms which tend to foul such surfaces, said composition comprising a water-resisting coating vehicle and an antifouling agent incorporated therein in an amount sufficient for substantially preventing adhesion of barnacles and like marine organisms on said surfaces, essential toxic ingredients of said antifouling agent being an insoluble copper compound and a hydrocarbon-mercuri perthiocyanate in which the hydrocarbon group is linked to the perthiocyanate group through mercury.

19. An antifouling composition for protecting surfaces exposed to sea water from attachment and growth thereon of barnacles and like marine organisms which tend to foul such surfaces, said composition comprising a water-resisting coating vehicle and an antifouling agent incorporated therein in an amount sufficient for substantially preventing adhesion of barnacles and like marine organisms on said surfaces, essential toxic ingredients of said antifouling agent being an insoluble copper compound and a phenyl-mercuri perthiocyanate.

WILLIAM H. HILL.

REFERENCES CITED

The following references are of record in the file of this patent:

UNITED STATES PATENTS

| Number | Name | Date |
|---|---|---|
| 2,086,419 | Hunt et al. | July 6, 1937 |
| 2,097,339 | Patterson et al. | Oct. 26, 1937 |
| 2,285,410 | Bousquet | June 9, 1942 |
| 2,287,218 | Young et al. | June 23, 1942 |
| 2,389,229 | Young | Nov. 20, 1945 |
| 2,411,815 | Sowa | Nov. 26, 1946 |

FOREIGN PATENTS

| Number | Country | Date |
|---|---|---|
| 329,987 | Great Britain | May 26, 1930 |

Certificate of Correction

Patent No. 2,521,720 September 12, 1950

WILLIAM H. HILL

It is hereby certified that error appears in the printed specification of the above numbered patent requiring correction as follows:

Column 3, line 70, for "ammounium" read *ammonium*; column 4, line 54, for "radial" read *radical*; line 59, for that portion of the equation reading "$(R_mM)_z$" read $(R_mM)_zX$; column 6, line 16, strike out the words "A composition of matter comprising"; same line for "a hydro-" read *A hydro-*;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*